May 23, 1939.   H. S. POLIN   2,159,531
LIQUID CONTENT INDICATOR
Filed Aug. 29, 1935
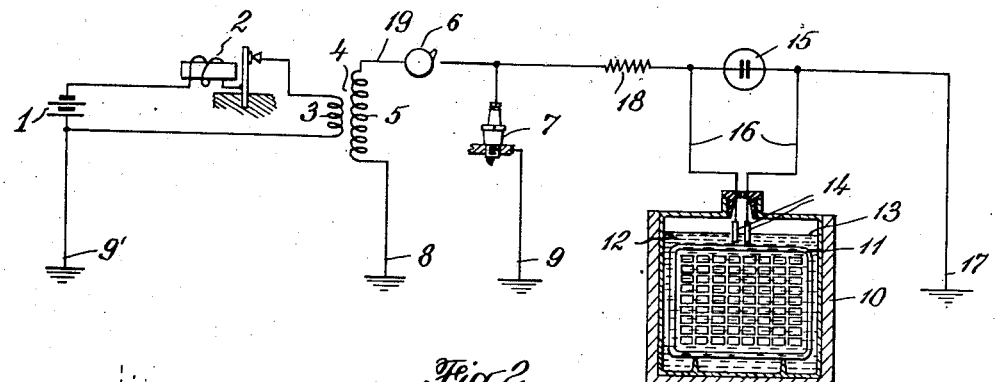
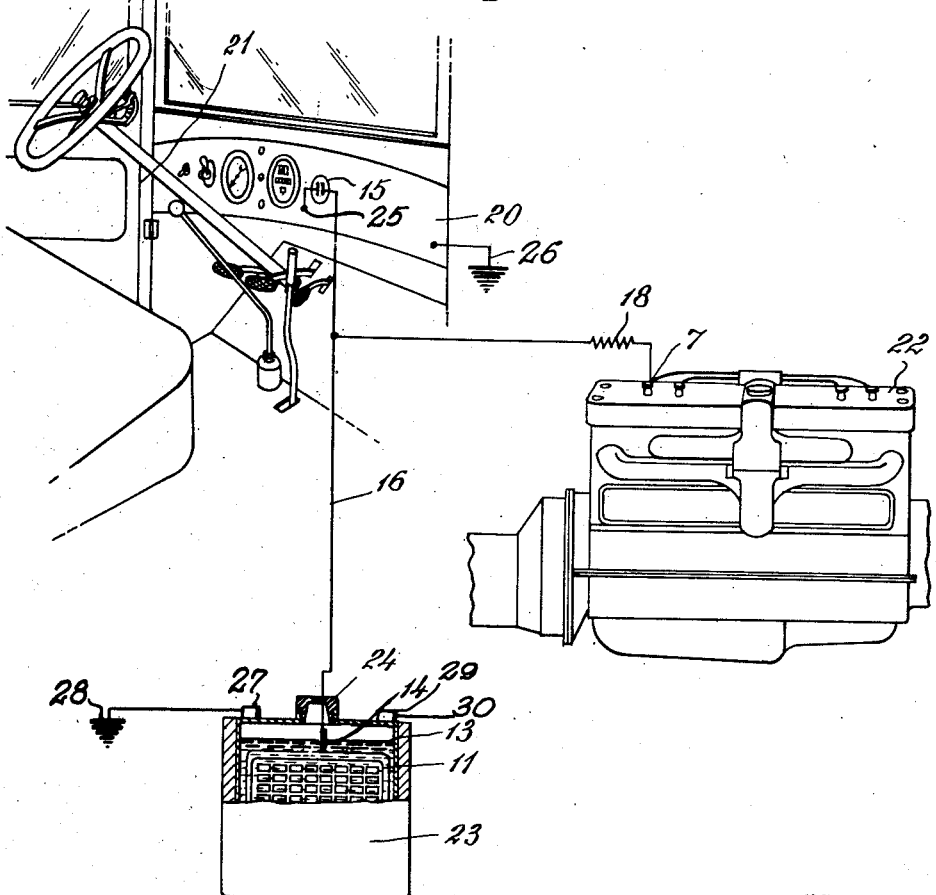
INVENTOR
Herbert S. Polin
BY
ATTORNEYS Patented May 23, 1939

2,159,531

UNITED STATES PATENT OFFICE 2,159,531

LIQUID CONTENT INDICATOR

Herbert S. Polin, Sands Point, N. Y.

Application August 29, 1935, Serial No. 38,383

2 Claims. (Cl. 177—311)

This invention relates to apparatus for remotely indicating the level of an electrically conducting solution in a container, with reference to a preselected level, such for example as the level of electrolyte in a wet electrolytic cell. The invention relates more particularly to apparatus for indicating on the dashboard of conveyances propelled by internal combustion engines, such as airplanes, automobiles, speed boats, etc., the level of electrolyte in the storage batteries with which such conveyances are usually equipped.

An object of the invention is to provide a remote indicator for purposes stated which provides a positive indication so long as the conducting solution is below a preselected level, for example a safe or permissible level. A further object is to provide an apparatus of this character which is exceedingly cheap and simple in construction and easily installed on conveyances of the type referred to, either in process of fabrication or after they have gone into use.

According to the invention, the container of the conducting solution—battery or other electrolytic cell, etc.—is provided with a pair of spaced electrodes at least one of which is exposed to the conducting solution only above the preselected or permissible level. The remaining electrode may be similarly limited as to exposure or it may continuously be immersed in the electrolyte. At some convenient point of indication, such as on the dashboard in the case of a battery equipped motor driven conveyance, there is provided an electrical indicator of relatively high resistive impedance as compared to the resistive impedance provided by the path through the conducting solution between the electrodes when immersed therein. Although a voltmeter may be utilized as the indicator, I prefer to use a small glow discharge tube such as a neon tube. The indicator is connected by appropriate conductors between the electrodes. One of these conductors is preferably grounded to the frame of the conveyance, while the remaining conductor is connected directly or through a current limiting impedance, such as a resistance, to a high tension point of the ignition system actuating the spark plugs of the internal combustion engine. The connection in question may in fact extend directly to one or more of the spark plugs, or it may extend to the portion of the high tension system connected to the rotary arm of the spark plug distributor switch.

In the operation of the system, so long as the conducting solution is at a level sufficient to contact both of the electrodes referred to, the conductive path between the electrodes through the solution, effectively short-circuits the indicator—voltmeter, neon tube, etc.—so that the latter shows no indication or substantially none. On the other hand, when the conducting solution falls below the preselected or permissible level, as by evaporation of a portion of the solute, so that at least one of the electrodes is no longer in contact therewith, the short circuit provided thereby is removed, with the result that the high tension ignition voltage is impressed across the indicator to actuate the same.

If the indicator comprises a glow discharge tube connected to the high tension system on the rotary switch arm side of the distributor, the tube will glow continuously under the conditions stated, and will thus serve as a warning to the operator that the battery needs attention. A more peremptory warning will result from connecting the tube to one of the spark plugs, in consequence of which the tube will flash intermittently coincident with each discharge across the spark plug air gap.

In the drawing:

Fig. 1 shows in part schematically and in part as a circuit diagram the invention as applied to the battery and ignition system of a conveyance propelled by an internal combustion engine; while Fig. 2 is a view partly in perspective and partly schematic, showing the invention as applied to the battery and ignition system of an automobile.

In Fig. 1 the ignition system comprises a battery 1 in circuit with an interrupter 2, and the primary winding 3 of a step-up transformer 4, adapted to generate across its secondary winding 5 a damped oscillatory high tension voltage applied seriatim through a rotary distributor 6, to the spark plugs of an internal combustion engine, one of which is shown at 7. For completing the discharge circuit the low potential terminals of winding 5 and spark plug 7 are grounded to the metal frame of the machine, as indicated at 8 and 9, one terminal of the battery 1 being likewise grounded as shown at 9'.

An electrolytic cell is designated schematically in transverse section at 10. This cell may or may not comprise the battery shown diagrammatically at 1, although usually in the case of an automobile, battery 1 and cell 10 will comprise one and the same unit, the units being shown separately in the drawing to facilitate explaining the principle of the invention.

With this understanding cell 10 contains the usual series of parallel spaced battery plates, one of which is shown in elevation at 11. The cell contains a conducting or electrolytic solution 12, such as dilute sulphuric acid. As is well understood, for proper operation the cell should contain sufficient electrolyte at all times to submerge plate 11 completely, as is illustrated in the drawing by the level 13 of the electrolyte.

In order to provide a remote indication as to the level of the electrolyte with reference to a preselected or permissible level thereof, which is preferably a level slightly in excess of the top of plates 11, the cell is provided with a pair of spaced electrodes, such as 14, mounted in the cell as shown, to contact or become immersed in the electrolyte only when its level exceeds the preselected or minimum permissible level. Although the drawing depicts both electrodes so disposed, it will be understood that this arrangement is required for only one of the electrodes; the other electrode may be submerged in whole or in part at all times and may thus comprise one of the plates 11.

A suitable indicator of the electrolyte level, such as a glow discharge or neon tube 15, is connected external to cell 10 and by means of appropriate conductors 16, between the electrodes 14. One terminal of element 15 is grounded to the metal frame of the conveyance as shown at 17; while the other terminal is connected, as shown, through a current limiting impedance, such as a resistance 18, preferably to the high potential terminal of spark plug 7; although resistance 18 may, if desired, be extended to any convenient point on conductor 19 joining the high potential terminal of the transformer secondary winding 5 to the distributor 6.

Referring to Fig. 2, the indicator or glow discharge tube 15 is shown mounted on the dashboard 20 of an automobile, a partial view of the interior of which is shown in perspective at 21; the engine of which is shown separately at 22; and the storage battery of which is shown separately in partial transverse section at 23. The elements bearing the same designations as Fig. 1, have the same significance. In this instance, only one electrode 14 is employed, which is conveniently mounted in spaced, insulated relation on one of the battery plugs 24, which is removable for adding distilled water to the electrolyte 13 to maintain the level thereof above the battery plates 11 as is required for normal operation. Electrode 14 is connected over conductor 16 to one terminal of the indicator 15, the opposite terminal of which is grounded, as indicated at 25, to the dashboard, the latter in turn being of course grounded to the body of the automobile in the usual manner, as indicated at 26. Likewise one of the terminals 27 of the battery is grounded, in the usual manner, to the body of the automobile, as indicated at 28, the remaining battery terminal 29 being ungrounded and connected over conductor 30 to the ignition coil, in accordance with the schematic showing of Fig. 1.

The indicator 15, should have a relatively high impedance in relation to the impedance through the electrolyte 12 between electrodes 14 when immersed therein, so that the electrolytic path will substantially short-circuit the indicator under these conditions. The indicator 15 should be operative on a current such as will not appreciably load the high tension transformer 4, as this would otherwise impair the proper functioning of the ignition system. Otherwise, this may be accomplished by inclusion of the current limiting impedance 18.

In the operation of the system, the path through the electrolyte between electrodes 14 will substantially short-circuit, and thereby render indicator 15 inoperative, so long as the electrodes are in contact with the electrolyte. This short circuit will be removed, however, to actuate the indicator when the level of the electrolytic solution falls below the electrodes 14. Actuation or illumination of the indicator, under these conditions, will serve to warn the operator that the battery requires attention. With the arrangement shown wherein the neon tube 15 is energized from one of the spark plugs, it will flash intermittently for each discharge of the spark plug and will thereby quickly direct the operator's attention to the abnormal condition.

The current traversing the electrolyte between electrodes 14 when immersed, is inherently so small, or may be made so by inclusion of resistance 18, as to have no deleterious influence on battery 10, for this reason and for the additional reason that this current is an alternating current.

What I claim is:

1. A liquid level indicator for a motor driven device including an internal combustion engine having a grounded ignition system with a source of high potential and a liquid container for comparatively low resistance liquid, a low resistance means for grounding the liquid, an electrode in said container at a preselected level, a high impedance indicator connected between said electrode and ground, and a high impedance connection from said electrode to said high potential source.

2. In a motor driven device in combination, an internal combustion engine, an ignition system therefor, a storage battery, and means for indicating the level of electrolyte in said battery with reference to a preselected level, said means comprising, a pair of spaced electrodes in said battery, at least one of which is exposed to said electrolyte only above said preselected level, an electrical indicator connected between said electrodes, and means for applying high tension voltage derived from said ignition system to said electrodes.

HERBERT S. POLIN.